United States Patent
Neupane et al.

(10) Patent No.: US 12,307,332 B2
(45) Date of Patent: May 20, 2025

(54) TRAINING AND USING A TWO STAGE MACHINE LEARNING MODEL TO PREDICT AN OUTCOME OF A PROSPECTIVE TRANSACTION

(71) Applicant: PayPal, Inc., San Jose, CA (US)

(72) Inventors: Piyush Neupane, Hayward, CA (US); Anirudh Singh Shekhawat, San Jose, CA (US); Prasiddha Malla, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 938 days.

(21) Appl. No.: 17/105,170

(22) Filed: Nov. 25, 2020

(65) Prior Publication Data

US 2022/0164699 A1    May 26, 2022

(51) Int. Cl.
    *G06N 20/00*      (2019.01)
    *G06N 5/022*      (2023.01)
    *G06Q 20/40*      (2012.01)

(52) U.S. Cl.
    CPC .............. *G06N 20/00* (2019.01); *G06N 5/022* (2013.01); *G06Q 20/401* (2013.01); *G06Q 20/407* (2013.01)

(58) Field of Classification Search
    CPC ........ G06N 20/00; G06N 5/022; G06N 20/20; G06Q 20/401; G06Q 20/407;
(Continued)

(56) References Cited

U.S. PATENT DOCUMENTS

2011/0047044 A1*   2/2011   Wright ................... G06Q 40/08
                                                           705/26.35
2018/0089585 A1*   3/2018   Rickard, Jr. ........... G06N 20/00
(Continued)

OTHER PUBLICATIONS

Wang et al., "IDK Cascades: Fast Deep Learning by Learning not to Overthink", 2018, arXiv, v4, pp. 1-11 (Year: 2018).*

(Continued)

*Primary Examiner* — David Yi
*Assistant Examiner* — Leonard A Sieger
(74) *Attorney, Agent, or Firm* — HAYNES AND BOONE, LLP

(57) ABSTRACT

A machine learning model, such as a Gradient Boosting Machine model, is trained using historical data associated with different types of operations. The machine learning model extracts features from the historical data and learns which features result in a predefined outcome, such as approval by a predefined entity. After the machine learning model is trained and validated as being accurate, it is used to predict the likelihood of a prospective operation achieving the predefined outcome when submitted right away versus a future date. If the likelihood of achieving the predefined outcome is low if submitted right away, the submission of the prospective operation is temporarily suspended. The machine learning model calculates a future time during which to submit the prospective operation for approval, where the future time has a greater likelihood of achieving the predefined outcome. This reduces waste of electronic resources including computer processing power and network communication bandwidth.

20 Claims, 10 Drawing Sheets

(58) Field of Classification Search
CPC .... G06Q 20/027; G06Q 20/12; G06Q 20/403; G06Q 20/405
See application file for complete search history.

(56) References Cited

U.S. PATENT DOCUMENTS

| | | | | |
|---|---|---|---|---|
| 2018/0150843 | A1* | 5/2018 | Adjaoute | G06N 20/00 |
| 2018/0374105 | A1* | 12/2018 | Azout | G06N 3/08 |
| 2020/0134628 | A1* | 4/2020 | Jia | G06N 20/00 |
| 2020/0402068 | A1* | 12/2020 | Cracknell | G06Q 20/4037 |
| 2021/0216905 | A1* | 7/2021 | Floratou | G06N 5/01 |

OTHER PUBLICATIONS

Provenzano et al., "Machine Learning approach for Credit Scoring", Aug. 5, 2020, arXiv, v1, pp. 1-28 (Year: 2020).*

Yufeng, "The 7 Steps of Machine Learning", 2017, Towards Data Science, retrieved from https://towardsdatascience.com/the-7-steps-of-machine-learning-2877d7e5548e on Mar. 7, 2024 (Year: 2017).*

Tutz et al., "Modeling Discrete Time-to-Event Data", 2016, Springer Series in Statistics (Year: 2016).*

Srihari, "Multiclass Logistic Regression", 2018, https://cedar.buffalo.edu/~srihari/CSE574/Chap4/4.3.4-MultiLogistic.pdf, retrieved from https://web.archive.org/web/20180328212814/https://cedar.buffalo.edu/~srihari/CSE574/Chap4/4.3.4-MultiLogistic.pdf on May 20, 2024 (Year: 2018).*

Mashhadi et al., "Stacked Ensemble of Recurrent Neural Networks for Predicting Turbocharger Remaining Useful Life", 2019, Applied Sciences, vol. 10 (2020), pp. 1-19 (Year: 2019).*

Viola et al., "Robust Real-Time Face Detection", 2004, International Journal of Computer Vision, vol. 57 No. 2, pp. 137-154 (Year: 2004).*

Ranganath et al., "The Survival Filter: Joint Survival Analysis with a Latent Time Series", 2015, UAI, vol. 2015, pp. 742-751 (Year: 2015).*

Ganjisaffar et al., "Bagging gradient-boosted trees for high precision, low variance ranking models", 2011, SIGIR '11: Proceedings of the 34th international ACM SIGIR conference on Research and development in Information Retrieval, vol. 34 (2011), pp. 85-94 (Year: 2011).*

Byrd et al., "What is the Effect of Importance Weighting in Deep Learning?", 2019, Proceedings of the 36th International Conference on Machine Learning, vol. 36 (2019), pp. 1-10 (Year: 2019).*

* cited by examiner

| CARD | 2018 | | | 2019 | | | |
|---|---|---|---|---|---|---|---|
| C1 | S DSS | D S | SD | DSSS | DS SSS | | DDDS | D SSSD |
| C2 | SSS | | S | S S | S S | S | S | D |
| C3 | | DDSS | D S | S SSS | S | | | S S |
| C4 | DD | D | | DDDDD | | | DDDD | DDD |
| C5 | | | | S SSS SSS S D | | D S SSS S D | | |
| C6 | | D | | | S | D | | |
| C7 | | | | DD | | | D | S |
| C8 | SS | | | DD | S S | S | S | S |

FIG. 2

| CARD | 1 YEAR HISTORY FROM TARGET | PROPORTION OF SUCCESSES | PROPORTION OF DECLINES | COUNT OF SUCCESSES | STANDARD DEVIATION OF SUCCESSES | TARGET | MODEL WEIGHT FOR THIS CARD |
|---|---|---|---|---|---|---|---|
| C1 | DS SSS SSS DDDS D | 62% | 38% | 8 | 3 | D | 0.09 |
| C2 | S S S SS S SSS | 100% | 0% | 9 | 1 | S | 0.10 |
| C3 | NA | | | | | NA | |
| C4 | D D DDDDDD | 0% | 100% | 0 | 0 | S | - |
| C5 | S SSS SSS S D | 89% | 11% | 8 | 2 | D | 0.10 |
| C6 | NA | | | | | NA | |
| C7 | | 0% | 100% | 0 | 0 | S | - |
| C8 | DD SS S | 60% | 40% | 3 | 1.4 | S | 0.23 |

250

231 → C1
232 → C2
234 → C4
235 → C5
237 → C7
238 → C8

AGGREGATED HISTORICAL TRANSACTION STATUS

FIG. 3

TRAINING AND USING A TWO STAGE MACHINE LEARNING MODEL TO PREDICT AN OUTCOME OF A PROSPECTIVE TRANSACTION

BACKGROUND

Field of the Invention

The present application generally relates to machine learning. More particularly, the present application involves predicting outcomes of online operations using a machine learning model, such as a Gradient Boosting Machine (GBM) model, trained on historical data, according to various embodiments.

Related Art

Rapid advances have been made in the past several decades in the fields of computer technology and telecommunications. These advances have led to more and more operations being conducted online. Although historical data can be extracted from these operations, the extracted historical data has not been sufficiently used to make machine-automated predictions for future online operations, such as the likely success or failure of the future online operations. What is needed is a system and method to train a machine-learning model using historical data extracted from online operations, and then using the trained machine-learning model to make machine-automated decisions for future online operations.

BRIEF DESCRIPTION OF THE FIGURES

FIGS. 2-4 illustrate various aspects of feature engineering according to various aspects of the present disclosure.

Figure 1:
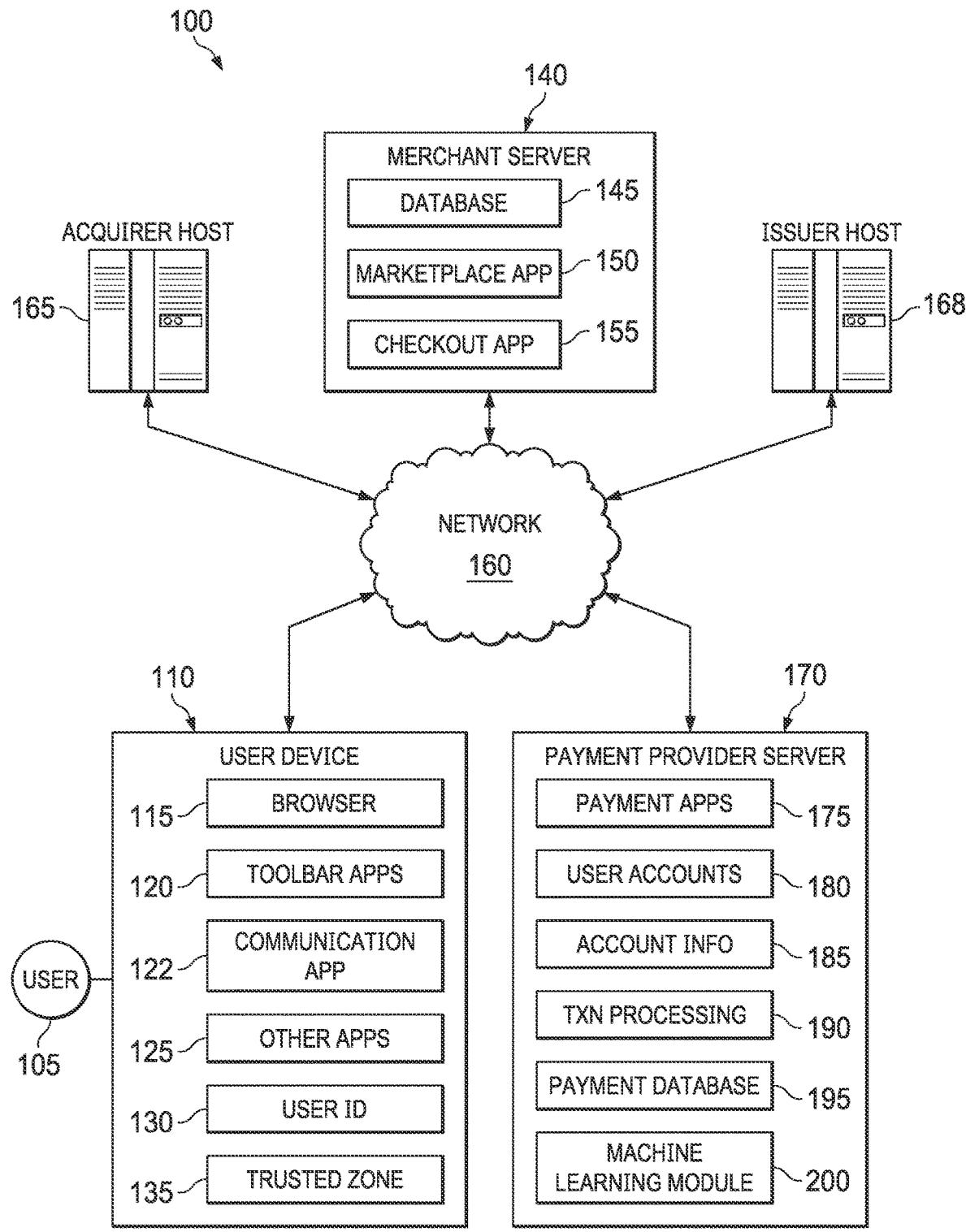
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to using machine learning to make predictions of outcomes of online operations. For example, an electronic database may store historical data of transactions associated with a plurality of funding instruments used in online operations. A feature engineering process is performed on the historical data, so that a machine learning model can learn what outcomes (e.g., transactions that are successfully approved versus transactions that are declined) are associated with what types of features of the transactions. After the machine learning model has been trained, it may be used to predict whether a prospective transaction will be approved. If the machine learning model predicts that the likelihood of the transaction being approved is low (below a certain threshold) if the transaction is submitted for processing right away, then the machine learning model may delay the submission of the prospective transaction for processing until a future date, where the likelihood of the transaction being approved is greater than a predefined threshold (which can be the same or different as the certain threshold). The various aspects of the present disclosure are discussed in more detail with reference to FIGS. 1-12.

FIG. 1 is a block diagram of a networked system 100 or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, and an issuer host 168 that are in communication with one another over a network 160. Payment provider server 170 may be maintained by a payment service provider, such as PayPal™, Inc. of San Jose, CA. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, and issuer host 168 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the Appstore™ of APPLE™ or GooglePlay™ of GOOGLE™.

In conjunction with user identifiers 130, user device 110 may also include a secure or trusted zone 135 owned or provisioned by the payment service provider with agreement from device manufacturer. The secure zone 135 may also be part of a telecommunications provider SIM that is used to store appropriate software by the payment service provider capable of generating secure industry standard payment credentials or other data that may warrant a more secure or separate storage, including various data as described herein.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145. In some embodiments, the merchant server 140 may also host a website for an online marketplace, where sellers and buyers may engage in purchasing transactions with each other.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, a machine learning module 200 may also be implemented on or accessible by the payment provider server 170. The machine learning module 200 may include one or more software applications or software programs that can be automatically executed (e.g., without needing explicit instructions from a human user) to perform certain tasks. For example, the machine learning module 200 may electronically access one or more electronic databases (e.g., the database 195 of the payment provider server 170 or the database 145 of the merchant server 140) to access or retrieve electronic data about users, such as the user 105, or transactions conducted by the user 105 or other users. The retrieved electronic data may contain historical data pertaining to transactions conducted by the user 105 or by other users. The machine learning module 200 may analyze the retrieved data, for example, by performing a feature engineering process on the retrieved data. The feature engineering process may extract features of transactions, such as the amount of each of the transactions, a total number of transactions for each or type of payment instrument, a percentage of transactions having a predefined outcome (e.g., approved or declined), a sequence of approved transactions, a sequence of declined transactions, etc. Based on the features and the eventual outcomes of the transactions, a machine learning model can be trained to predict, with accuracy, which transactions are likely to be approved (exceeding a certain threshold) if submitted right away. The machine learning model can also be trained to predict a future date(s) in which a prospective transaction, when submitted at that time, is most likely to be approved (exceeding the same or different certain threshold).

Based on the above, the machine learning module 200 can automate decision-making processes such as when to submit a prospective transaction for approval. Using state-of-the-art machine learning techniques such as Gradient Boosting Machine (GBM), the machine learning module 200 may quickly and automatically determine whether a prospective transaction should be submitted for approval right away, or delay such a submission until a future date. This results in a greater success rate of submitted transactions, which helps conserve system resources. In other words, since transactions that otherwise would likely be declined are not submitted right away, the present disclosure can reduce unnecessary network traffic, thereby freeing up network communication bandwidth. In addition, the present disclosure also reduces unnecessary data entry and/or electronic processing that would otherwise be wasted on submitting/processing transactions that are likely to fail. As such, the machine learning module 200 transforms a generic computer into a special machine capable of performing specific predefined tasks: identifying which transactions to submit for approval right away and which other transactions to submit for approval in a future date as well as the exact future date. Accordingly, the present disclosure offers an improvement in computer technology.

It is noted that although the machine learning module 200 is illustrated as being separate from the transaction processing application 190 in the embodiment shown in FIG. 1, the transaction processing application 190 may implement some, or all, of the functionalities of the machine learning module 200 in other embodiments. In other words, the machine learning module 200 may be integrated within the transaction processing application 190 in some embodiments. In addition, it is understood that the machine learning module 200 (or another similar program) may be implemented on the merchant server 140, on a server of any other entity operating a social interaction platform, or even on a portable electronic device similar to the user device 110 (but may belong to an entity operating the payment provider server 170) as well. It is also understood that the machine learning module 200 may include one or more sub-modules that are configured to perform specific tasks. For example, the machine learning module 200 may include a first sub-module configured to train the machine learning model, as well as a second sub-module configured to make predictions based on the trained model.

Still referring to FIG. 1, a payment network may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. The payment network interfaces with the acquirer host 165, the issuer host 168, and/or the payment provider 170 server to facilitate transactions, according to various embodiments. For example, the payment provider server 170 may forward a transaction request to the payment network. The payment network may assess the transaction and may then send it to the acquirer host 165 or the issuer host 168 as a part of processing the transaction request. However, in some situations, a payment processor (e.g., the entity operating the payment provider server 170) may be penalized by the payment network if the payment processor sends an excess number of transactions that could have been determined by the payment processor to be fraudulent. As such, the payment processor may need to carefully screen the transactions in order to avoid the penalties. Since screening transactions may increase transaction latency, the payment processor is configured to screen some transactions with more scrutiny and other transactions with less scrutiny, according to some embodiments of the present disclosure. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card. According to various aspects of the present disclosure, the payment provider server 170 may determine (with the help of the machine learning module 200) whether to submit a transaction (e.g., a transaction conducted between the user 105 and the merchant server 140) to the issuer host 168 for approval right away, or delay such a submission to a future date if the odds of the issuer host 168 approving the transaction are lower than a predefined threshold, as discussed below in more detail.

FIG. 2 provides a simplified visual illustration of a sampling process for historical data that can be extracted from past online operations, such as past transactions to purchase goods or services online. In that regard, FIG. 2 illustrates a chart 220 that contains the historical data extracted from online transactions for a plurality of funding instruments over a predefined period of time, for example, over two years. The funding instruments are represented by a plurality of cards C1-C8, where each of the cards C1-C8 represents a different funding instrument, such as a credit card, a debit card, a checking account, a savings account, etc. The funding instruments C1-C8 may be a combination of different funding instruments of the same type (e.g., credit cards) or different funding instruments of different types. The funding instruments C1-C8 may be funding instruments for a same user in some embodiments, or for different users in other embodiments. For each of the funding instruments, a successful transaction (e.g., an authorization or approval of a transaction to purchase a product or a service) is labeled as an "S" in the chart 220, and an unsuccessful transaction (e.g., a denial or rejection of a transaction to purchase a product or a service) is labeled as a "D" in the chart 220.

The "S"s and "D"s in the chart 220 are illustrated in a chronological order over the years 2018 and 2019, which is the predefined period of time during which the transactions associated with each of the funding instruments occurred. According to some embodiments of the present disclosure, a subset of the transactions is sampled from each of the funding instruments. The subset of the transaction sampled may be randomly selected. For example, for each of the funding instruments C1-C8, one of its transactions is randomly selected, and then the transactions preceding that randomly selected transaction over another predefined period of time (e.g., one year) are extracted. The outcome (e.g., success or decline) of the selected transaction is a target that a machine learning model of the present disclosure needs to learn, given the historical data. The target may be considered a dependent variable, while the historical data may be considered independent variables (also referred to as predictors). In other words, the machine learning model is learning what variables (extracted from the historical data) led to a particular outcome of the transaction. Note that the outcome need not be either a success or a decline, but can be more granular to include an initial approval, but later declined for some reason or an initial decline, but later approved for some reason, including a verification of authentication.

As a simplified example, the chart 220 in FIG. 2 illustrates randomly sampled transactions 231 for the funding instrument C1, randomly sampled transactions 232 for the funding instrument C2, randomly sampled transactions 234 for the funding instrument C4, randomly sampled transactions 235 for the funding instrument C5, randomly sampled transactions 237 for the funding instrument C7, and randomly sampled transactions 238 for the funding instrument C8. Such a sampling method may help capture the true and accurate flow of transactions involving any given funding instrument. In other words, historical success/decline status of a funding instrument maybe a better indicator of whether a future transaction involving that funding instrument will be accepted or declined rather than a more recent or aged sequence of transactions.

FIG. 3 illustrates a simplified example feature engineering process performed to the randomly sampled transactions for the various funding instruments C1-C8. In more detail, FIG. 3 illustrates a chart 250, which includes the randomly sampled transactions 231, 232, 234, 235, 237, and 238 for the funding instruments C1, C2, C4, C5, C7, and C8, respectively. Again, these randomly sampled transactions were transactions that occurred within 1-year (or some other predefined time period) prior to the target transaction. As shown in the chart 250, the targets for the randomly sampled transactions 231, 232, 234, 235, 237, and 238 are D (representing a decline or unsuccessful transaction), S (representing a successful transaction), S, D, S, and S, respectively.

The feature engineer process extracts a plurality of features from the randomly sampled transactions 231-238. The features may include historical transaction statuses. As non-limiting examples, the features shown in the chart 250 may include a proportion of successes (e.g., a percentage of the sampled transactions that were successfully authorized/approved), a proportion of declines (e.g., a percentage of the sampled transactions that were unsuccessfully authorized/approved), a number of successes (e.g., a total number of the sampled transactions that were successfully authorized/approved), and a standard deviation of the successes. Other non-limiting examples of the features may include a monetary amount of each of the sampled transactions, a first sequence of successful transactions, a second sequence of unsuccessful transactions, a first date of a most recent successful transaction, a second date of a most recent unsuccessful transaction, a predefined number of recent transaction decision reversals (success-to-decline, or decline-to-success), the average or mean of the number of successful (or unsuccessful) transactions over a predefined number of days (e.g., a week, a month, or a year), and the average or mean of the monetary amount of successful (or unsuccessful) transactions over a predefined number of days. The feature engineering process aggregates these features, which when analyzed, will describe certain characteristics of the corresponding funding instrument in terms of its transactional behavior.

The chart 250 also illustrates a model weight for at least some of the funding instruments. For example, the model weight for the funding instrument C1 is 0.09, the model weight for the funding instrument C2 is 0.1, the model weight for the funding instrument C5 is 0.1, and the model weight for the funding instrument C8 is 0.23. The value of the weight indicates how much the features of the corresponding funding instrument is used in the machine learning model training, which will be discussed in more detail below. The greater the value, the more heavily the corresponding funding instrument is used in the machine learning model training. Note that in some embodiments, a greater weight is given to the funding instruments that have fewer transactions. This is done to give the machine learning model more chances to learn from the sparse patterns of transactions. In some embodiments, a lower weight is given to the funding instruments that have mostly successes, or mostly declines (e.g., successes or declines exceeding a predefined proportion threshold as a total number of transactions). This is because a machine learning model cannot learn much from a funding instrument whose transactions are typically approved, or whose transactions are typically declined. As such, these funding instruments are de-prioritized in the machine learning model training, for example, by assigning them a lower value for the model weight. Conversely, for funding instruments that have numerous successes interspersed with the declines, there may be valuable hidden information from which the machine learning model can learn. Therefore, these funding instruments are prioritized, for example, by assigning them a higher value for the model weight.

Figure 4:
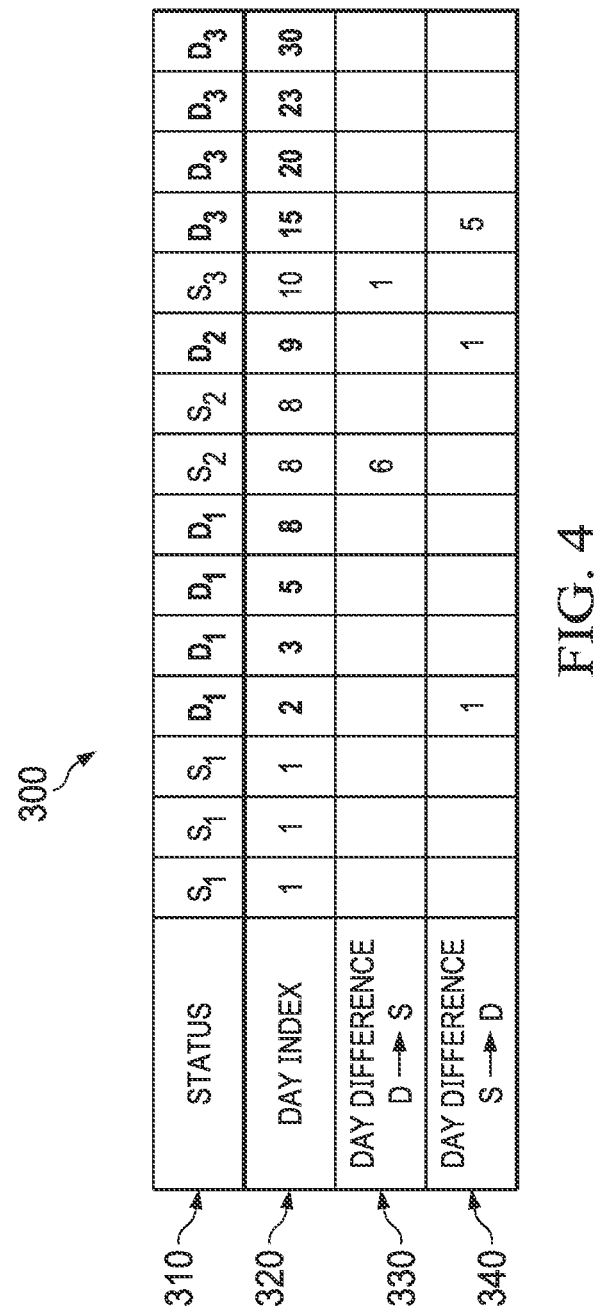

FIG. 4 shows a chart 300 that visually illustrates one example aspect of the feature engineering process. For example, the chart 300 illustrates a status of transactions 310 that include successful transactions (labeled by $S_1$, $S_2$, and $S_3$) and unsuccessful transactions (labeled by $D_1$, $D_2$, and $D_3$) for the randomly sampled transactions of a given funding instrument. In more detail, the status of transactions 310 is represented by $S_1S_1S_1D_1D_1D_1D_1S_2S_2D_2S_3D_3D_3D_3D_3$. The chart 300 also illustrates a day index 320 that indicates the day/date on which the transaction (whether it is a successful transaction or an unsuccessful transaction) occurred. In this illustrated example, a sequence of three successful transactions $S_1S_1S_1$ occurred on day 1. A sequence of four unsuccessful transactions $D_1D_1D_1D_1$ occurred on days 2, 3, 5, and 8, respectively. A sequence of two successful transactions $S_2S_2$ occurred on day 8. An unsuccessful transaction $D_2$ occurred on day 9. A successful transaction $S_3$ occurred on day 10. A sequence of four unsuccessful transactions $D_3D_3D_3D_3$ occurred on days 15, 20, 23, and 30, respectively. The above status of transactions 310 may be collapsed as $[S_1D_1S_2D_2S_3D_3]$. Such a status of transactions may be considered the features that can be extracted to train machine learning models.

Based on this simplified example, it can be seen that the status changepoints of the day index 320 can be represented as [1 2 8 9 10 15], meaning that the status of the transactions changed (either from a success to a decline, or vice versa) on day 1, day 2, day 8, day 9, day 10, and day 15. Such a status (or status change) of transactions may also be considered a feature that can be extracted to train machine learning models.

Furthermore, the chart 300 shows a day difference D→S 330 and a day difference S→D 340. The day difference D→S 330 indicates the number of days that had declined transactions before a successful transaction occurred. For example, on day 8, there was a successful transaction $S_2$. Prior to that successful transaction $S_2$, there had been 6 days of declined transactions (e.g., 4 declined transactions $D_1$ occurring on days 2-8). As another example, on day 10, there was another successful transaction $S_3$. Prior to that successful transaction $S_3$, there had been 1 day of a declined transaction (e.g., 1 declined transaction $D_2$ occurring on day 9). Conversely, the day difference S→D 340 indicates the number of days that had successful transactions before a declined transaction occurred. For example, on day 2, there was a declined transaction $D_1$. Prior to that declined transaction $D_1$, there had been 1 day of successful transactions (e.g., 3 successful transactions $S_1$ all occurring on day 1). As another example, on day 9, there was another declined transaction $D_2$. Prior to that declined transaction $D_2$, there had been 1 day of successful transactions (e.g., 2 successful transactions $S_2$ all occurring on day 8). As yet another example, on day 15, there was another declined transaction $D_3$. Prior to that declined transaction $D_3$, there had been 1 day of successful transactions (e.g., 1 successful transactions $S_3$ occurring on day 10). These day differences before transaction status changes may also be considered features that can be extracted to train machine learning models.

In some embodiments, the feature engineering process may break down the transactions for a given instrument by amount-tiers, which may also be considered features extracted from the sample transaction data. For example, transactions less than or equal to $10 may be classified as tier 1 transactions, transactions greater than $10 but less than or equal to $100 may be classified as tier 2 transactions, transactions greater than $100 but less than or equal to $500 may be classified as tier 3 transactions, and transactions greater than $500 may be classified as tier 4 transactions. In some embodiments, predictions generated for one tier may automatically apply to other tiers, but not vice versa. For example, if a machine learning model predicts that a transaction in tier 3 will be approved, then it is automatically predicted that a transaction in tier 1 will also be approved. However, if a machine learning model predicts that a transaction in tier 1 will be approved, it does not automatically mean that a transaction in tier 3 will also be approved.

Figure 5:
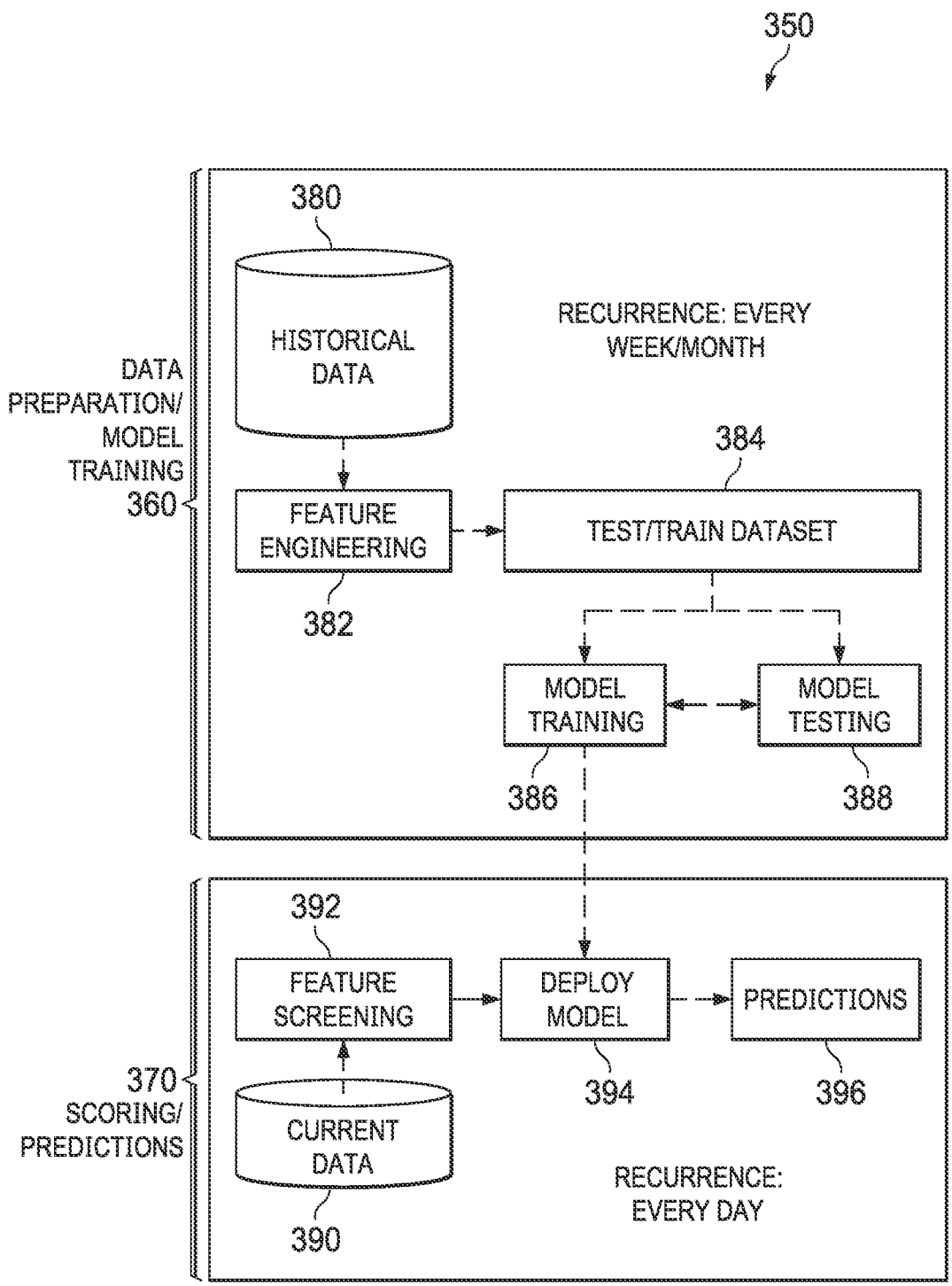
FIGS. 5-8 illustrate block diagrams of machine learning architectures according to various aspects of the present disclosure.

FIG. 5 is a block diagram of a machine learning process flow 350 according to various aspects of the present disclosure. The machine learning process flow 350 includes a data preparation and model training process 360, as well as a scoring and predictions process 370. In some embodiments, the data preparation and model training process 360 occurs at a predefined time interval, for example, every week or every month. In some embodiments, the scoring and predictions process 370 also occurs at a predefined time interval, for example, every day.

As a first step of the data preparation and model training process 360, historical data 380 is collected, for example, from an electronic database. The historical data 380 may include data about previous transactions of various funding instruments for various users, such as the historical transaction data shown in FIGS. 2-3 for the funding instruments C1-C8. As a second step of the data preparation and model training process 360, a feature engineering process 382 is performed. The feature engineering process 382 may be similar to the feature engineering process discussed above with reference to FIGS. 3-4. As a third step of the data preparation and model training process 360, a test/train dataset 384 is generated based on the feature engineering process 382.

As a fourth step of the data preparation and model training process 360, a model training process 386 and a model testing process 388 are performed. The model training process 386 trains a machine learning model using the data obtained from the test/train dataset. In some embodiments, the machine learning model is a Gradient Boosting Machine (GBM) model (e.g., a LightGBM model), which may include ensemble decision trees. The model testing process 388 tests the machine learning model trained by the model training process 386 and feeds the results back to the model training process 386, so that the model training process 386 can be refined or improved.

According to various aspects of the present disclosure, the parameter settings of the GBM model may be optimized to reduce the noise in the input data. In more detail, historical customer transaction patterns (e.g., the historical data 380) may be noisy, and as such, it may be difficult to extract generalizable patterns from this data. In addition, the target outcome may be one of the next 30 days (as discussed in more detail below), which introduces additional element of uncertainty. Therefore, the parameters of the GBM model are selected to reduce overfitting (learning too much from noise), and to focus more on reproducible or repeated patterns in the data.

Listed below is a non-limiting example of the optimized parameters and their values for a LightGBM classifier, set to satisfy the needs of the present disclosure:

```
sklgb1 = LGBMClassifier(boosting_type='gbdt',
    objective = 'binary',
    metric='auc',
    max_depth=10,
    learning_rate=0.05,
    n_estimators=500,
    feature_fraction=0.8,
    bagging_fraction=0.8,
    bagging_freq=5,
    verbose=0,
    min_data_in_leaf=5,
    reg_alpha=5,
    reg_lambda=10
)
```

This above setting helps to address the issue of noise in the input data. For example, the max depth parameter "max_depth" controls the max depth of a tree, where a tree is a single unit of learning in a decision tree of the LightGBM model. Setting "max_depth=10" means that each tree is a relatively weak learner, so that each tree learns a relatively small amount of information from the data. This helps to generalize of future predictions, because forcing each tree to learn small amounts of information allows it to prioritize the most important information. Each tree has an objective of maximizing accuracy based on the constrains defined by these parameters.

Setting the parameter "n_estimators=500" means the maximum number of trees allowed is 500. Accordingly, each of those 500 trees learns different things about the data. In this manner, the LightGBM model herein creates a boosted ensemble of all the trees and creates the final predictions, thereby combining all learnings into a single model.

Other parameters such as feature_fraction, bagging_fraction, reg_lambda, reg_alpha each introduces element of randomization to the data that allows further generalization of the predictions. It also means that any noise learned by the tree is given less weight, and patterns that keep on showing up in different trees are given more weight. A hyperparameter optimization process is also performed to scan through all possible combinations of parameters. The set of parameters that yields the highest prediction accuracy on the hold-out dataset is selected, where the hold-out dataset includes data that is set aside before training, and the LightGBM model never had a chance to learn from it.

In some embodiments, for a given funding instrument that was recently declined, the model testing process 388 may predict, based on the previous historical data available, how many days after the decline date will a successful transaction occur for the funding instrument. For example, a credit card X (as an example funding instrument) was declined on day 0. The model testing process 388 may predict, based on the model trained by the model training process 386, that a future transaction for the credit card X will succeed or be approved by a credit card issuer (e.g., VISA™) on day 0, day 3 and day 10. The model testing process 388 will then compare such a prediction with the actual record of the credit card X, which indicates that successful transactions were made for the credit card X on day 3 and day 7. Since there is at least one match between the prediction and the actual record (e.g., for day 3), then the prediction is considered accurate, and that information is fed back to the model training process 386 to reinforce the machine learning model training. Conversely, if no match was found, then the prediction is considered inaccurate, and that information is also fed back to the model training process 386 to help the machine learning model learn from its inaccurate predictions.

After the data preparation and model training process 360 has been completed, its results may be used to make predictions in the scoring/predictions process 370. As a first step of the scoring/predictions process 370, current data 390 about a transaction may be obtained. This transaction may be a prospective transaction, for example, a transaction initiated by a user who wants to buy goods or services from a merchant. The current data 390 obtained from such a transaction may include similar parameters as those in the historical data 380 (based on which the machine learning model has been trained), such as amount of transaction, type of transaction (such as type of services, content, or items being purchased), location of transaction, time and/or date of transaction, date of previous successfully authorized or declined transactions, etc. As a second step of the scoring/predictions process 370, a feature engineering process 392 is performed. The feature engineering process 392 may be similar to the feature engineering process 382 or also similar to the feature engineering process discussed above with reference to FIGS. 3-4. As a third step of the scoring/predictions process 370, the machine learning model trained by the model training process 386 is deployed in a deploy model process 394 to evaluate the likelihood of the current transaction being successfully authorized or declined. As a fourth step of the scoring/predictions process 370, predictions 396 are made by on the deploy model process 394, which in some embodiments may yield a percentage as an indicator of the likelihood of the current transaction being successfully authorized or declined.

Figure 6:
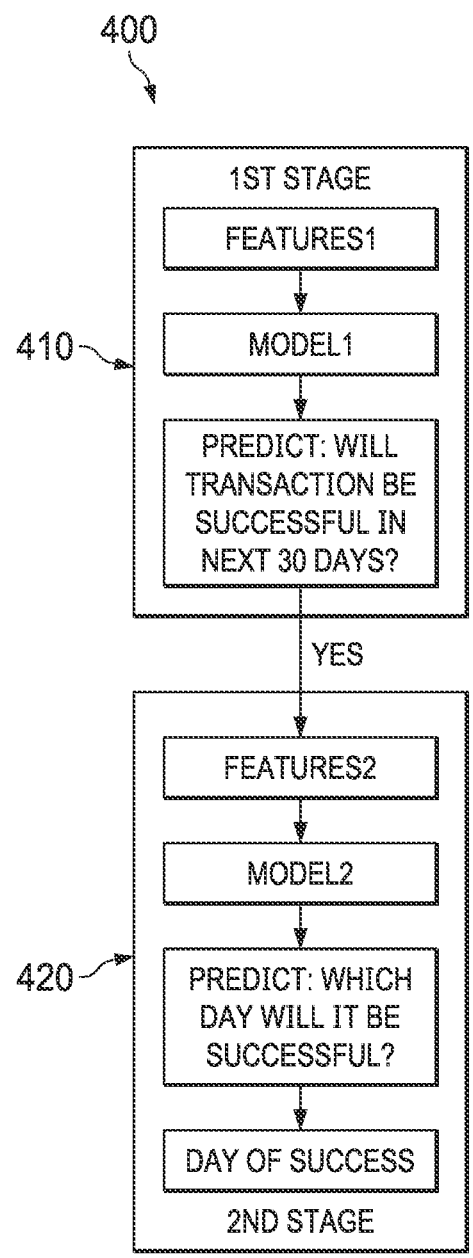

In some embodiments, the training of the machine learning model is done in multiple stages. Such an embodiment is illustrated in FIG. 6, which is a block diagram of a two-stage machine learning training model 400. In a first stage 410 of the two-stage machine learning training model 400, features 1 (e.g., from the feature engineering process discussed above) are used to train a model 1. The model 1 is then used to predict whether a transaction for a given funding instrument will be successful in the next 30 days (or another predefined period of time). If the answer is yes, then in a second stage 420 of the two-stage machine learning training model 400, the prediction from the first stage is used to train features 2 (e.g., from the feature engineering process discussed above) are used to train a model 2. The model 2 is then used to predict an exact date (or dates) during which a transaction for a given funding instrument will be successful. The result from that prediction will be generated as the day/date (or days/dates) of success. The two-stage machine learning training model 400 will be discussed in more detail below.

Figure 7:
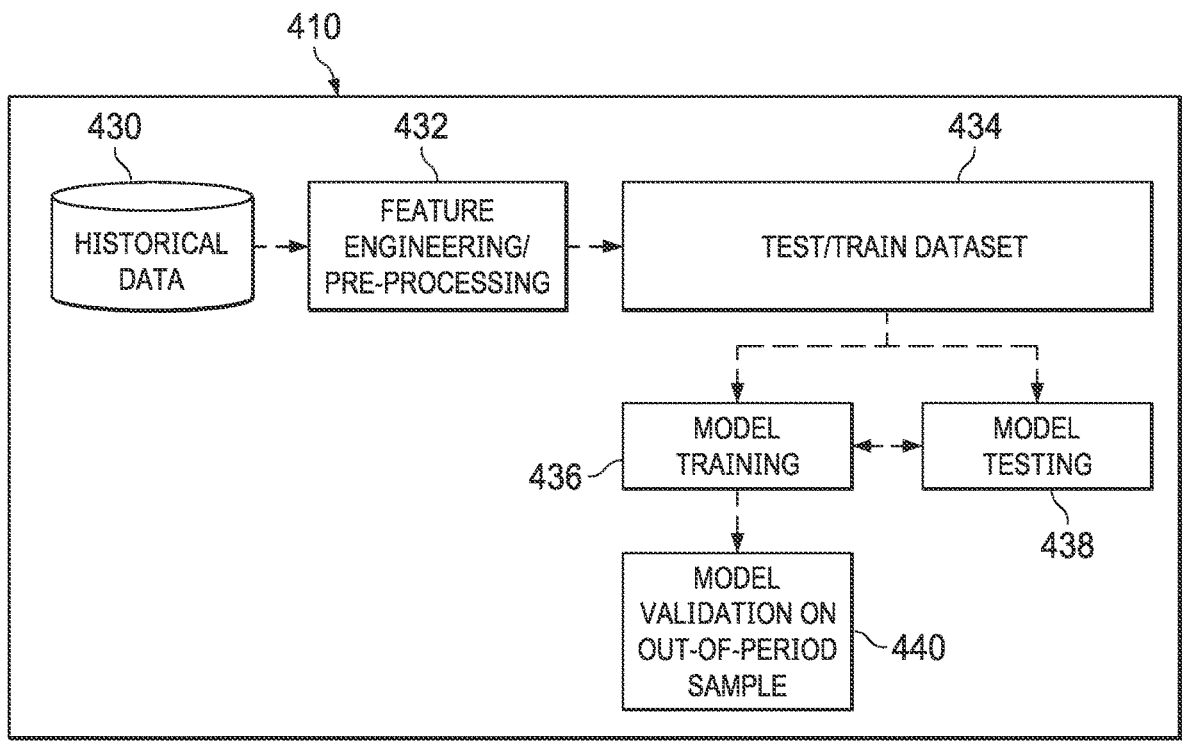

Referring now to FIG. 7, the stage 410 of the two-stage machine learning training model 400 is illustrated as a block diagram in more detail. As a first step of the stage 410, historical data 430 is collected, for example, from an electronic database. The historical data 430 may include data similar to the historical data 380 discussed above, such as data pertaining to previous transactions of various funding instruments for various users (e.g., the historical transaction data shown in FIGS. 2-3 for the funding instruments C1-C8). As a second step of the stage 410, a feature engineering process 432 (also referred to as a pre-processing process) is performed. The feature engineering process 432 may be similar to the feature engineering process discussed above with reference to FIGS. 3-4. As a third step of the stage 410, a test/train dataset 434 is generated based on the feature engineering process 432.

As a fourth step of the stage 410, a model training process 436 and a model testing process 438 are performed. The model training process 436 and the model testing process 438 may be similar to the model training process 386 and the model testing process 388 discussed above, respectively. For example, the model training process 436 trains a machine learning model using the data obtained from the test/train dataset. In some embodiments, the machine learning model is a Gradient Boosting Machine (GBM) model, which may include ensemble decision trees. The model testing process 438 tests the machine learning model trained by the model training process 436 and feeds the results back to the model training process 436, so that the model training process 436 can be refined or improved.

In some embodiments, the model training process 436 is performed at least in part by inspecting the number of transactions in the past year for a given funding instrument, or even for a specific tier of transactions for the given funding instrument (e.g., each funding instrument may be broken down to multiple tiers, as discussed above). A declined transaction is randomly selected for the given funding instrument (or for the specific tier within the funding instrument). The model training process 436 then locates the next successful transaction after the randomly-selected declined transaction and calculates the number of days separating the declined transaction and the successful transaction. For example, if the declined transaction occurred on Mar. 10, 2019, and the next successful transaction occurred on Mar. 27, 2019, then the number of days separating the declined transaction and the successful transaction is 17 days. In some embodiments, if the number of days separating them is between 0 and 30, a binary flag is generated as the target that the machine learning model is supposed to learn from. For example, a binary flag of 1 represents an approved transaction as a successful outcome, and a binary flag of 0 represents a declined transaction as an unsuccessful outcome. This trains the model to determine whether a prospective transaction is likely to have a successful approval within the next 30 days. As a fifth step of the stage 410, a model validation process 440 is performed on out-of-period samples, so as to confirm whether the trained model in stage 410 can accurately predict whether a transaction will have the successful approval in the next 30 days.

Figure 8:
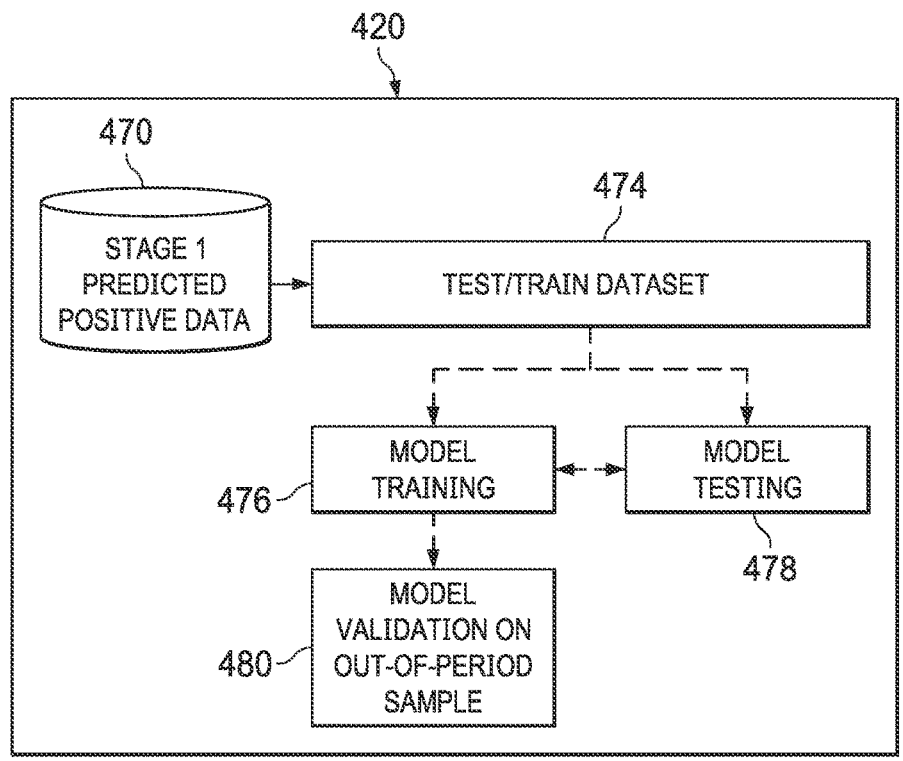

Referring now to FIG. 8, the stage 420 of the two-stage machine learning training model 400 is illustrated as a block diagram in more detail. As a first step of the stage 420, the stage 1 predicted positive data 470 is accessed. In some embodiments, the data 470 includes the transactions that have been predicted by the stage 410 to have a successful outcome over the next 30 days. As a second step of the stage 420, a test/train dataset 434 is generated based on the stage 1 predicted positive data 470. As a third step of the stage 420, a model training process 476 and a model testing process 478 are performed. The model training process 476 and the model testing process 478 may be similar to the model training process 386 and the model testing process 388 discussed above, respectively. For example, the model training process 476 trains a machine learning model using the data obtained from the test/train dataset. In some embodiments, the machine learning model is a Gradient Boosting Machine (GBM) model, which may include ensemble decision trees. The model testing process 478 tests the machine learning model trained by the model training process 476 and feeds the results back to the model training process 476, so that the model training process 476 can be refined or improved.

In some embodiments, the model training process 476 is performed at least in part by inspecting the number of transactions in the past year for a given funding instrument, or even for a specific tier of transactions for the given funding instrument (e.g., each funding instrument may be broken down to multiple tiers, as discussed above). A declined transaction is randomly selected for the given funding instrument (or for the specific tier within the funding instrument). The model training process 476 then locates the next successful transaction after the randomly-selected declined transaction and calculates the number of days separating the declined transaction and the successful transaction. Since the data 470 came from the transactions predicted by the stage 410 to have a successful outcome in the next 30 days after a declined transaction, the number of days separating the declined transaction and the successful transaction in the model training process 476 should all be within 0 and 30. The model training process 476 will create 31 buckets (representing the numbers between, and including, 0 and 30) for each given funding instrument (or for the specific tier within each funding instrument). A binary flag of 1 is generated for the day corresponding to the successful transaction, and a binary flag of 0 is generated for the other days. For example, a tier 1 of a funding instrument C1 may have a successful transaction at day 3 after the declined transaction. In that case, the day 3 bucket is assigned the binary flag 1, while the rest of the 30 days buckets are each assigned the binary flag 0. In this manner, the binary flags within the 31 buckets of days are used as the targets from which the machine model is learning. As a fourth step of the stage 420, a model validation process 480 is performed on out-of-period samples, so as to confirm whether the trained model in stage 420 can accurately predict the exact date or day on which a transaction will have the successful approval.

Figure 9:
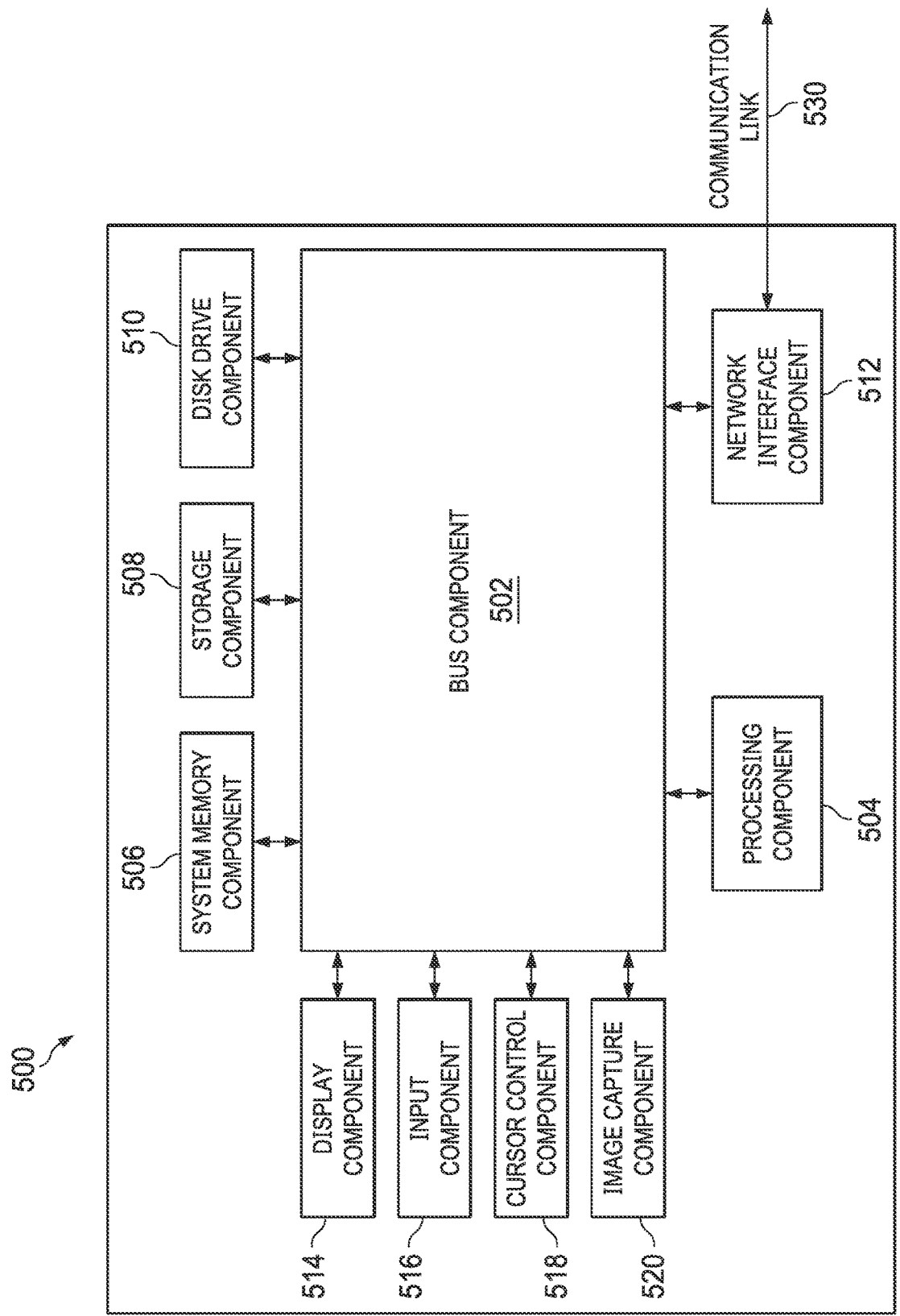
FIG. 9 is an example computer system according to various aspects of the present disclosure.

FIG. 9 is a block diagram of a computer system 500 suitable for implementing various methods and devices described herein, for example, the machine learning module 200, the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the machine learning module 200 and the various method steps of the method 1000 discussed below (or the user device 110, the merchant server 140, or the payment provider server 170) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the machine learning module 200 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the machine learning module 200 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the machine learning module 200 and external devices, for example with the user device 110, with the merchant server 140, or with the payment provider server 170, depending on exactly where the machine learning module 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the machine learning module 200 may be implemented as such software code.

Figure 10:
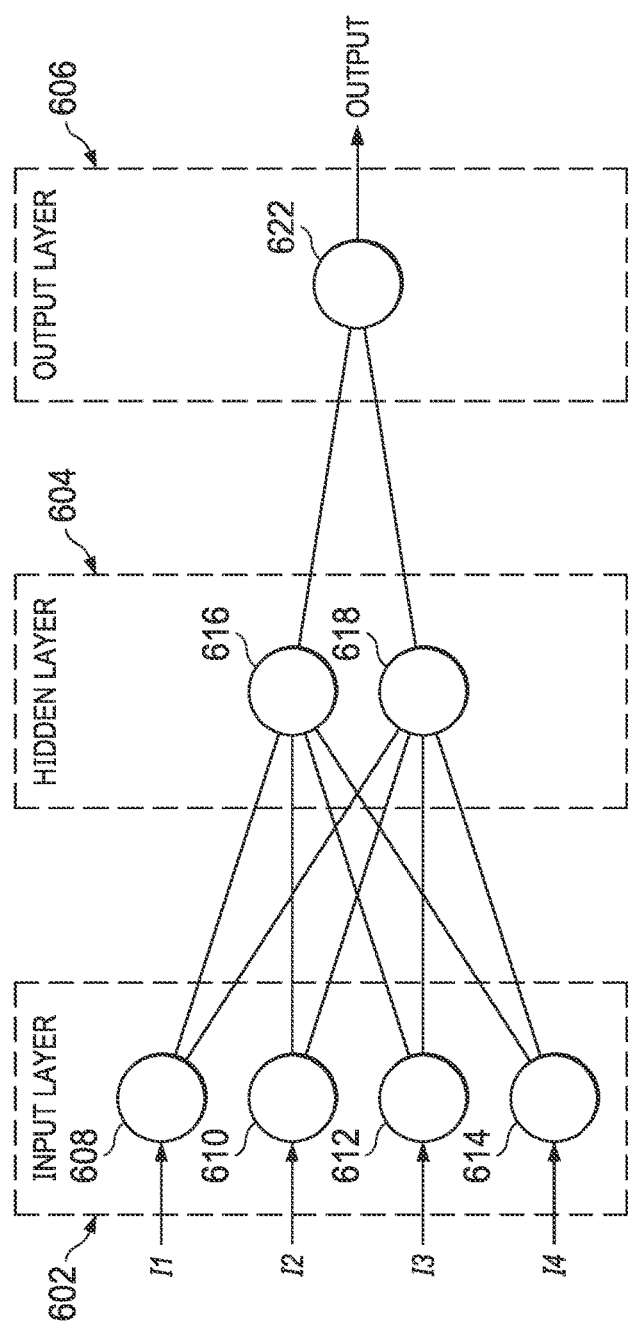
FIG. 10 illustrates an example system involving neural networks according to various aspects of the present disclosure.

As discussed above, machine learning is used to learn and predict which features of transactions lead to what types of outcomes. In some embodiments, the machine learning may be performed at least in part via an artificial neural network, which may be used to implement the machine learning module 200 of FIG. 2. In that regard, FIG. 10 illustrates an example artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the machine learning module 260, and the machine learning module 260 may include as many hidden layers as necessary.

In this example, the artificial neural network 600 receives a set of input values and produces an output value. Each node in the input layer 602 may correspond to a distinct input value. For example, when the artificial neural network 600 is used to implement machine learning module 260, each node in the input layer 602 may correspond to a distinct attribute of an analyzed language usage pattern of a user.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the machine learning module 260, the output value produced by the artificial neural network 600 may indicate a likelihood of an event (e.g., a decision to grant or deny the applicant user's request to obtain the status).

The artificial neural network 600 may be trained by using training data. For example, the training data herein may be the features extracted from historical data of transactions. By providing training data to the artificial neural network 600, the nodes 616-618 in the hidden layer 604 may be trained (adjusted) such that an optimal output (e.g., determining a value for a threshold) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, gradient boosting may be used to implement the machine learning, which is a machine learning technique for regression and classification problems. Gradient boosting generates a prediction model, which could be in the form of decision trees. As another example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 11:
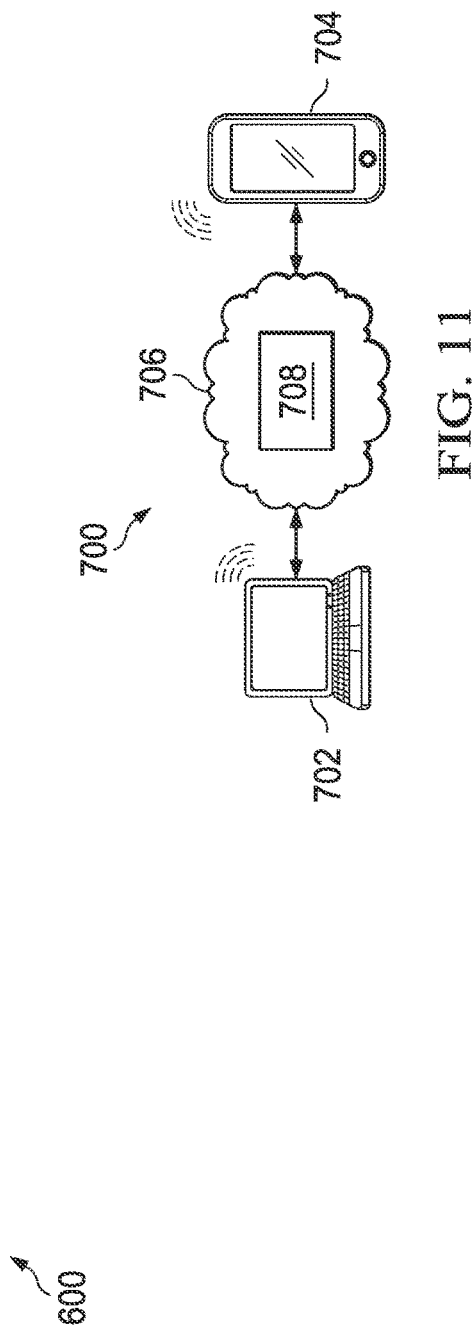
FIG. 11 is a simplified example of a cloud-based computing architecture according to various aspects of the present disclosure.

FIG. 11 illustrates an example cloud-based computing architecture 700, which may also be used to implement various aspects of the present disclosure. The cloud-based computing architecture 700 includes a mobile device 704 (e.g., the user device 110 of FIG. 1) and a computer 702 (e.g., the merchant server 140 or the payment provider server 170), both connected to a computer network 706 (e.g., the Internet or an intranet). In one example, a consumer has the mobile device 704 that is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. However, other divisions of responsibility are also possible in various embodiments. In some embodiments, using this cloud architecture, the machine learning module 200 may reside on the merchant server 140 or the payment provider server 170, but its functionalities can be accessed or utilized by the mobile device 704, or vice versa.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702. The system and method for performing the machine learning process as discussed above may be implemented at least in part based on the cloud-based computing architecture 700.

It is understood that the various components of cloud-based computing architecture 700 are shown as examples only. For instance, a given user may access the cloud-based resources 708 by a number of devices, not all of the devices being mobile devices. Similarly, a merchant or another user may access the cloud-based resources 708 from any number of suitable mobile or non-mobile devices. Furthermore, the cloud-based resources 708 may accommodate many merchants and users in various embodiments.

Figure 12:
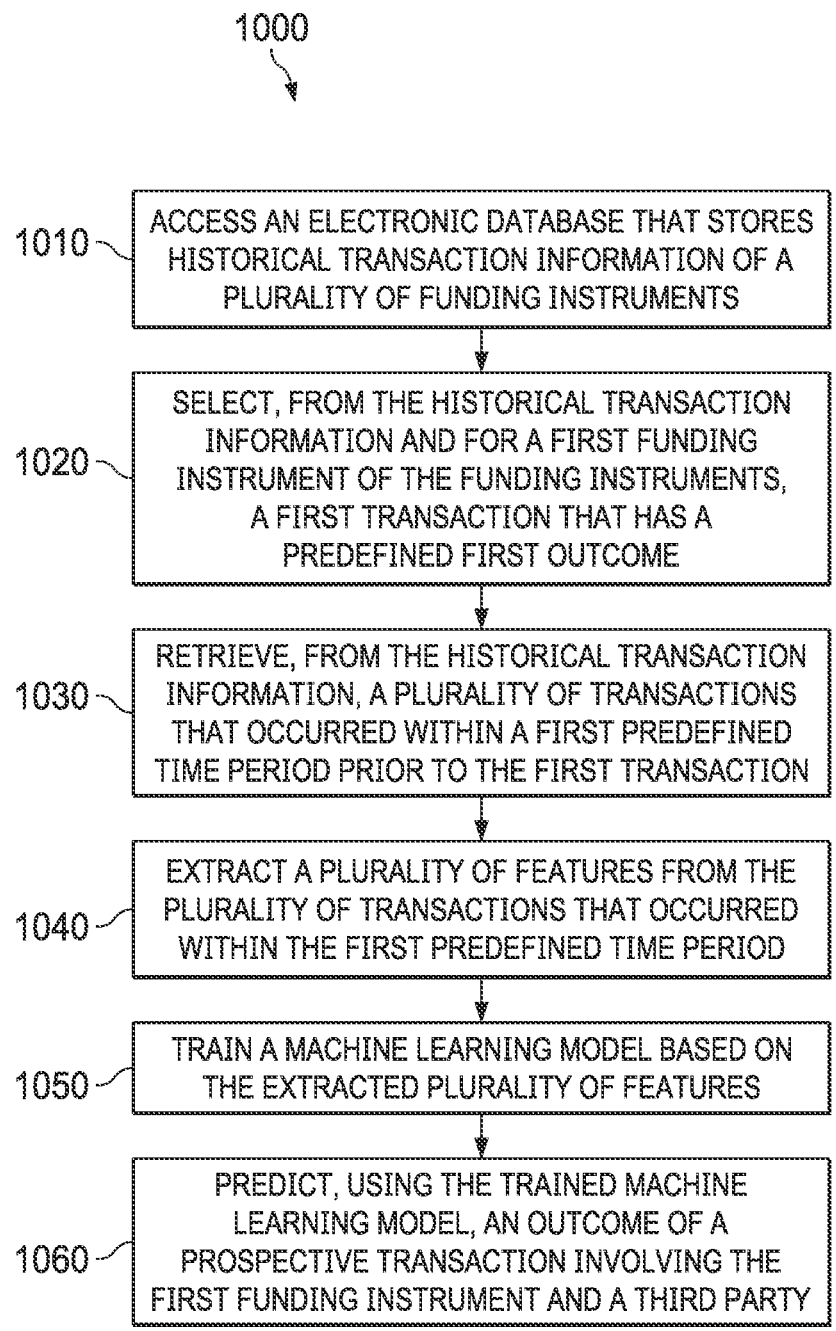
FIG. 12 is a flowchart illustrating a method of machine learning according to various aspects of the present disclosure.

FIG. 12 is a flowchart illustrating a method 1000 for performing a machine learning process according to various aspects of the present disclosure. The various steps of the method 1000, which are described in greater detail above, may be performed by one or more electronic processors, for example by the processors of a computer of an entity that may include: a payment provider, an operator of an electronic transaction platform, or a business analyst. In some embodiments, at least some of the steps of the method 1000 may be performed by the machine learning module 200 discussed above.

The method 1000 includes a step 1010 to access an electronic database that stores historical transaction information of a plurality of funding instruments.

The method 1000 includes a step 1020 to select, from the historical transaction information and for a first funding instrument of the funding instruments, a first transaction that has a predefined first outcome.

The method 1000 includes a step 1030 to retrieve, from the historical transaction information, a plurality of transactions that occurred within a first predefined time period prior to the first transaction.

The method 1000 includes a step 1040 to extract a plurality of features from the plurality of transactions that occurred within the first predefined time period.

The method 1000 includes a step 1050 to train a machine learning model based on the extracted plurality of features.

The method 1000 includes a step 1060 to predict, using the trained machine learning model, an outcome of a prospective transaction involving the first funding instrument and a third party.

In some embodiments, the step 1050 of training of the machine learning model comprises: training a first stage machine learning model that predicts whether the prospective transaction will be approved by the third party within a second predefined time period following a request to process the prospective transaction, and then training a second stage machine learning model that predicts which day within the second predefined time period is most likely to result in an approval of the prospective transaction by the third party. In some embodiments, the training of the machine learning model comprises training a Gradient Boosting Machine (GBM) model.

In some embodiments, the predefined first outcome comprises a successful approval of the first transaction by the third party.

In some embodiments, the predefined first outcome comprises a decline of the first transaction by the third party.

In some embodiments, the features comprise: a total number of the plurality of transactions, a monetary amount of each of the plurality of transactions, a first percentage of the plurality of the transactions that had the predefined outcome, a second percentage of the plurality of the transactions that had an outcome different from the predefined outcome, a first sequence of transactions having the predefined outcome, a second sequence of transactions having the outcome different from the predefined outcome, a first date of a most recent transaction having the predefined outcome, or a second date of a most recent transaction having the outcome different from the predefined outcome.

In some embodiments, the step 1020 comprises randomly selecting the first transaction.

It is understood that additional method steps may be performed before, during, or after the steps 1010-1060 discussed above. For example, the method 1000 may include a step to determine, based on the predicting, a date on which to submit the prospective transaction for approval by the third party. As another example, the method 1000 may include a step to build an aggregate set of features at least in part by repeating the steps 1020-1040 for each funding instrument of the plurality of funding instruments. In some embodiments, the step 1050 of training the machine learning model is based on the aggregate set of features. In some embodiments, the step of building the aggregate set of features comprises assigning different weights to different funding instruments of the plurality of funding instruments. In some embodiments, the step of assigning the different weights comprises assigning a greater weight to a funding instrument having fewer transactions within the first predefined time period than a funding instrument having more transactions within the first predefined time period. In further embodiments, steps 1010 to 1050 may be performed to initially train or re-train the machine learning model, and then step 1060 may be performed multiple times on the same trained or retrained machine learning model (such as by accessing the machine learning model from the payment provider server 170 or other location). The model may be retrained once a certain amount of new historical data is available or other factor, such as a higher than expected number of approved or denied transactions.

Based on the above discussions, systems and methods described in the present disclosure offer several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, the present disclosure uses machine learning to determine the likelihood of successful approval of transactions. If the likelihood of success is low (e.g., below a predefined threshold), then instead of submitting that transaction to another party (e.g., a credit card issuer) for approval right away, the present disclosure temporarily holds the transaction and determines a future date (e.g., 5 days from the present) on which to submit the transaction. By doing so, the present disclosure reduces the waste of resources associated with transactions that are likely to be declined. In other words, submitting and/or processing transactions will necessarily result in the consumption of computer processing power and/or network communication bandwidth. If these transactions are likely to fail, then the consumption of the computer processing power and/or network communication bandwidth would have been wasted. Therefore, by reducing the submission of such transactions, the present disclosure helps to conserve computer processing power and/or network communication bandwidth, and as such improves the functionality of a computer.

The inventive ideas of the present disclosure are also integrated into a practical application, for example into the machine learning module 200 discussed above. Such a practical application can automatically predict the likelihood of a particular outcome (e.g., failure or success) of a transaction. In addition, such a practical application also predicts the future date on which the transaction is more likely to be approved. Therefore, by submitting the transaction for approval on the predicted future date, the present disclosure may help increase customer satisfaction, drive up total payment volume, and improve merchant retention, which are useful in many contexts.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a machine learning method that includes the following steps: accessing an electronic database that stores historical transaction information of a plurality of funding instruments; selecting, from the historical transaction information and for a first funding instrument of the funding instruments, a first transaction that has a predefined first outcome; retrieving, from the historical transaction information, a plurality of transactions that occurred within a first predefined time period prior to the first transaction; extracting a plurality of features from the plurality of transactions that occurred within the first predefined time period; training a machine learning model based on the extracted plurality of features; and predicting, using the trained machine learning model, an outcome of a prospective transaction involving the first funding instrument and a third party.

Another aspect of the present disclosure involves a system that includes a non-transitory memory and one or more hardware processors coupled to the non-transitory memory and configured to read instructions from the non-transitory memory to cause the system to perform operations comprising: accessing an electronic database that stores historical transaction data of a plurality of funding instruments; performing a feature engineering process on the historical transaction data; training, based on the feature engineering process, a first machine learning model that predicts a likelihood of approval of prospective transactions associated with the plurality of funding instruments within a predefined time period; predicting, based on the training of the first machine learning model, that prospective transactions of a first subset of the funding instruments will be approved during the predefined time period; training, based on historical transaction data for the first subset of the funding instruments, a second machine learning model that predicts one or more exact dates within the predefined time period during which the prospective transactions of each the first subset of the funding instruments will be approved; and determining, based on the first machine learning model and the second machine learning model, whether a prospective transaction of one of the funding instruments should be submitted for approval.

Yet another aspect of the present disclosure involves a non-transitory machine-readable medium having stored thereon machine-readable instructions executable to cause a machine to perform operations comprising: accessing an electronic database that stores historical transaction information of a plurality of funding instruments; randomly selecting, from the historical transaction information and for a first funding instrument of the funding instruments, a first transaction that was declined; retrieving, from the historical transaction information, a plurality of transactions that occurred within a first predefined time period prior to the first transaction being declined; extracting a plurality of features from the plurality of transactions that occurred within the first predefined time period, the features comprising: a total number of the plurality of transactions, an monetary amount of each of the plurality of transactions, a first percentage of the plurality of the transactions that had been declined, a second percentage of the plurality of the transactions that had been approved, a first sequence of transactions that have been declined, a second sequence of transactions that have been approved, a first date of a most recent transaction that has been declined, or a second date of a most recent transaction that has been approved; training a Gradient Boosting Machine (GBM) machine learning model based on the extracted plurality of features; receiving a request to process a first transaction; determining, using the trained machine learning model, a likelihood of the first transaction being approved by a third party if the first transaction is submitted right away or at a plurality of future dates; and submitting the first transaction to the third party for approval at a first future date in response to a determination that the first transaction is more likely to be approved by the third party when submitted on the first future date.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A machine learning method, comprising:
   accessing an electronic database that stores historical transaction information of a plurality of funding instruments;
   selecting, from the historical transaction information and for a first funding instrument of the plurality of funding instruments, a first transaction that has a predefined first outcome;
   retrieving, from the historical transaction information, a plurality of transactions that occurred within a first predefined time period prior to the first transaction;
   extracting a plurality of features from the plurality of transactions that occurred within the first predefined time period;
   building an aggregate set of features at least in part by repeating the selecting, the retrieving, and the extracting for the plurality of funding instruments, wherein the aggregate set of features is further built by assigning different weights to different funding instruments of the plurality of funding instruments, including assigning a greater weight to a funding instrument having fewer transactions within the first predefined time period than a funding instrument having more transactions within the first predefined time period;
   training a machine learning model based on the aggregate set of features, wherein the training of the machine learning model comprises:
      training, using the aggregate set of features as training data, a first stage machine learning model that predicts whether a prospective transaction involving the first funding instrument and a third party will be approved by the third party within a second predefined time period following a request to process the prospective transaction; and
      training, using an output from the first stage machine learning model as training data, a second stage machine learning model that predicts which time window within the second predefined time period is most likely to result in an approval of the prospective transaction by the third party, wherein the training of the second stage machine learning model comprises:
         randomly selecting, for each of the plurality of funding instruments, a declined transaction from the plurality of transactions that occurred during the first predefined time period;
         accessing, for each randomly selected declined transaction, information pertaining to a plurality of predefined time slots that occurred after the randomly selected declined transaction;
         identifying, for each randomly selected declined transaction, a particular time slot among the plurality of predefined time slots in which a first successful transaction occurred after the randomly selected declined transaction;
         assigning a first type of binary status to the particular time slot; and
         assigning a second type of binary status to a rest of the plurality of predefined time slots, wherein the particular time slot with the assigned first type of binary status and the rest of the plurality of predefined time slots with the second type of binary status are used as further training data for the second stage machine learning model;
      wherein the training the first stage machine learning model or the training the second stage machine learning model is performed at least in part by configuring one or more parameters of the first stage machine learning model or one or more parameters of the second stage machine learning model, such that a noise learned from the training the first stage machine learning model or the training the second stage machine learning model is given less weight than repeatable patterns in the training data; and
   predicting, using the trained machine learning model, an outcome of the prospective transaction.

2. The machine learning method of claim 1, wherein the predefined first outcome comprises a successful approval of the first transaction by the third party, or a decline of the first transaction by the third party.

3. The machine learning method of claim 1, further comprising:
determining, based on the predicting, a date on which to submit the prospective transaction for approval by the third party.

4. The machine learning method of claim 1, wherein the features comprise: a total number of the plurality of transactions, an monetary amount of each of the plurality of transactions, a first percentage of the plurality of the transactions that had the predefined first outcome, a second percentage of the plurality of the transactions that had an outcome different from the predefined first outcome, a first sequence of transactions having the predefined first outcome, a second sequence of transactions having the outcome different from the predefined first outcome, a first date of a most recent transaction having the predefined first outcome, or a second date of a most recent transaction having the outcome different from the predefined first outcome.

5. The machine learning method of claim 1, wherein the training of the machine learning model comprises training a Gradient Boosting Machine (GBM) model.

6. The machine learning method of claim 1, wherein the selecting comprises randomly selecting the first transaction.

7. The machine learning method of claim 1, wherein the accessing, the selecting, the retrieving, the extracting, the training, or the predicting is performed using one or more hardware processors.

8. A system, comprising:
a non-transitory memory; and
one or more hardware processors coupled to the non-transitory memory and configured to read instructions from the non-transitory memory to cause the system to perform operations comprising:
accessing, from an electronic database, historical transaction data of a plurality of funding instruments;
performing a feature engineering process on the historical transaction data, thereby generating an aggregate set of features, wherein the feature engineering process is performed at least in part by assigning weights to different funding instruments of the plurality of funding instruments in a manner that is inverse to a number of transactions conducted via the funding instrument within a specified time period;
training, based on the using the aggregate set of features as training data, a first machine learning model that predicts a likelihood of approval of prospective transactions associated with the plurality of funding instruments within a predefined time period, wherein during the training of the first machine learning model, a noise learned from the training is given less weight than repeatable patterns in the training data;
predicting, based on the training of the first machine learning model, that prospective transactions of a first subset of the funding instruments will be approved during the predefined time period;
training, based on historical transaction data for the first subset of the funding instruments, a second machine learning model that predicts one or more time windows within the predefined time period during which the prospective transactions of each the first subset of the funding instruments will be approved, wherein an output of the first machine learning model is used as training data for the training of the second machine learning model, and wherein the training of the second machine learning model comprises:
accessing information pertaining to a plurality of predefined time slots that occurred after a selected declined first historical transaction;
identifying, for the selected declined first historical transaction, a particular time slot among the plurality of predefined time slots responding to a first successful transaction that occurred after the selected declined first historical transaction;
generating a first type of binary flag for the particular time slot;
generating a second type of binary flag for a rest of the plurality of predefined time slots; and
training the second machine learning model while using the particular time slot with the first type of binary flag and the rest of the plurality of predefined time slots with the second type of binary flag as further training data for the training of the second machine learning model; and
determining, based on the first machine learning model and the second machine learning model, whether a prospective transaction of one of the funding instruments should be submitted for approval.

9. The system of claim 8, wherein the first machine learning model and the second machine learning model each comprises a Gradient Boosting Machine model.

10. The system of claim 8, wherein the training of the first machine learning model comprises:
randomly selecting a declined second transaction for each of the funding instruments;
determining, for each of the funding instruments, whether the randomly selected declined second transaction is followed by at least one approved transaction for the predefined time period following the randomly selected declined second transaction;
generating the first type of binary flag for the funding instruments that had at least one approved transaction for the predefined time period following the randomly selected declined second transaction;
generating the second type of binary flag for the funding instruments that had no approved transaction for the predefined time period following the randomly selected declined second transaction; and
using the first type and the second type of binary flags as a first target to train the first machine learning model.

11. The system of claim 10, wherein the training of the first machine learning model further comprises:
identifying, for each of the funding instruments with the first type of binary flag, a date of the approved transaction;
calculating, for each of the funding instruments with the first type of binary flag, a number of days between the date of the approved transaction and a date of the randomly selected declined second transaction;
assigning, to each of the funding instruments with the first type of binary flag, a numeric value corresponding to the calculated number of days; and
using the assigned numeric value as a second target to train the second machine learning model.

12. The system of claim 8, wherein the feature engineering process is performed for each of the funding instruments.

13. The system of claim 12, wherein the feature engineering process analyzes features that comprise: a total number of transactions, an monetary amount of each of the transactions, a first percentage of the transactions that had been approved, a second percentage of the transactions that had been declined, a first cluster of approved transactions, a second cluster of declined transactions, a first date of a most recent approved transaction, or a second date of a most recent declined transaction.

14. A non-transitory machine-readable medium having stored thereon machine-readable instructions executable to cause a machine to perform operations comprising:
receiving a request to process a first transaction;
accessing a Gradient Boosting Machine (GBM) machine learning model trained based on a first transaction using a first funding instruction that was declined from randomly selected historical transaction information of a plurality of funding instruments and a plurality of features extracted from a plurality of transactions that occurred within a first predefined time period prior to the first transaction being declined, wherein the GBM machine learning model is trained at least in part by assigning a greater weight to a subset of the plurality of funding instruments having fewer transactions than to another subset of the plurality of funding instruments having more transactions, and wherein the GBM machine learning model is further trained based on:
a trained first stage machine learning model that predicts whether the first transaction will be approved by a third party within a second predefined time period following the received request to process the first transaction, wherein the first stage machine learning model is trained at least in part by decreasing an amount of weight given to a noise learned by the first stage machine learning model and increasing an amount of weight given to a repeatable pattern in training data for the first stage machine learning model; and
a trained second stage machine learning model that predicts one or more time windows within the second predefined time period on which the first transaction, if submitted, is most likely to be approved by the third party, wherein an output of the trained first stage machine learning model is used as training data for the trained second stage machine learning model, and wherein the trained second machine learning model is trained at least in part by:
selecting, for each of the plurality of funding instruments, a declined transaction from the plurality of transactions that occurred during the first predefined time period;
determining, for each selected declined transaction, that a particular time slot among a plurality of predefined time slots contained a successful transaction that occurred most recently after the selected declined transaction;
assigning a first type of binary status to the particular time slot; and
assigning a second type of binary status to a rest of the plurality of predefined time slots, wherein the particular time slot with the assigned first type of binary status and the rest of the plurality of predefined time slots with the second type of binary status are used as further training data for the trained second stage machine learning model;
determining, using the trained GBM machine learning model, a likelihood of the first transaction being approved by the third party if the first transaction is submitted now or at a plurality of future time windows; and
submitting the first transaction to the third party for approval at a first future time window in response to a determination that the first transaction is more likely to be approved by the third party when submitted at the first future time window.

15. The non-transitory machine-readable medium of claim 14, wherein the operations further comprise: determining the first future time window via the GBM machine learning model.

16. The non-transitory machine-readable medium of claim 14, wherein the plurality of features comprises: a total number of the plurality of transactions, an monetary amount of each of the plurality of transactions, a first percentage of the plurality of the transactions that had a predefined first outcome, a second percentage of the plurality of the transactions that had an outcome different from the predefined first outcome, a first sequence of transactions having the predefined first outcome, a second sequence of transactions having the outcome different from the predefined first outcome, a first date of a most recent transaction having the predefined first outcome, or a second date of a most recent transaction having the outcome different from the predefined first outcome.

17. The non-transitory machine-readable medium of claim 14, wherein the first predefined time period or the second predefined time period comprises a predefined number of consecutive days.

18. The non-transitory machine-readable medium of claim 14, wherein the second stage machine learning model is retrained at a more frequent basis than the first stage machine learning model.

19. The machine learning method of claim 1, wherein the output from the first stage machine learning model is tested before being sent to the second stage machine learning model as the training data.

20. The machine learning method of claim 1, wherein the first stage machine learning model or the second stage machine learning model comprises a tree, and wherein the configuring of the one or more parameters comprises configuring a depth of the tree.

* * * * *